United States Patent [19]

Bieler et al.

[11] 4,456,512

[45] Jun. 26, 1984

[54] PHOTOCHEMICAL REACTOR AND METHOD

[75] Inventors: Barrie H. Bieler, Walnut Creek, Calif.; David C. Morgan, Magnolia, Tex.; Robert R. Stringham, Concord, Calif.

[73] Assignee: The Dow Chemical Company, Midland, Mich.

[21] Appl. No.: 403,187

[22] Filed: Jul. 29, 1982

Related U.S. Application Data

[63] Continuation-in-part of Ser. No. 356,679, Mar. 10, 1982, abandoned.

[51] Int. Cl.³ .............................................. B01J 19/12
[52] U.S. Cl. .......................... 204/162 R; 204/157.1 R; 204/158 R; 210/748; 422/186.30
[58] Field of Search ............ 204/162 R, 157.1–162 R, 204/263, 269; 422/186.30, 186.29; 210/748; 436/905; 23/919

[56] References Cited

U.S. PATENT DOCUMENTS

| | | | |
|---|---|---|---|
| 2,622,205 | 12/1952 | Miller et al. | 422/186.3 |
| 3,554,887 | 1/1971 | Feehs | 204/163 |
| 3,926,556 | 12/1975 | Boucher | 21/54 R |
| 4,043,886 | 8/1977 | Bierker | 204/157.10 R |
| 4,076,420 | 2/1978 | DeMaeyer | 356/73 |
| 4,087,342 | 5/1978 | Bloomfield | 204/157.10 R |
| 4,193,879 | 3/1980 | Leach | 204/157.10 R |
| 4,211,621 | 7/1980 | Porter | 204/157.10 R |
| 4,233,126 | 11/1980 | Garcia | 204/157.10 H |
| 4,247,379 | 1/1981 | Leach | 204/157.10 R |
| 4,311,570 | 1/1982 | Cowen et al. | 204/157.10 H |

FOREIGN PATENT DOCUMENTS 754402 2/1971 France .

OTHER PUBLICATIONS

"Photochemical Technology", *Encyclopedia of Chemical Technology*, John Wiley & Sons, N.Y., 1982, pp. 540–559.

Carlson et al., Science, vol. 174, p. 76, (1971).

*Primary Examiner*—Benjamin R. Padgett
*Assistant Examiner*—M. Moskowitz

[57] ABSTRACT

Photochemical reactions are carried out by passing the fluid to be irradiated through a plurality of capillaries, each of which is surrounded by an actinic-radiation emitting plasma; the capillaries being transparent to the radiation. By banding the capillaries with a radiation-opaque material, the fluid being treated can repeatedly be subjected to brief periods of irradiation, alternating with periods of non-irradiation, during each pass through the capillaries.

20 Claims, 2 Drawing Figures

FIGURE I

PHOTOCHEMICAL REACTOR AND METHOD

CROSS-REFERENCE TO RELATED APPLICATION

This is a continuation-in-part of co-pending application Ser. No. 356,679, filed Mar. 10, 1982, now abandoned.

BACKGROUND OF THE INVENTION

In the preface to his text, Molecular Photochemistry, published in 1967 (W. A. Benjamin, Inc.; N.Y.), N. J. Furro noted a "tremendous surge of interest and activity in photochemistry" which had occurred in the preceding decade. The number of since-issued patents on photochemical processes testifies to a continued growth in activity (and interest). For example (and as evidence of the wide applicability of photochemistry), the following specific patents may be noted.

U.S. Pat. No. 3,775,275 Preparation of oxiranes from paraffins.
U.S. Pat. No. 3,937,956 Isotope separations.
U.S. Pat. No. 3,736,240 Chlorination of vinyl chloride polymer.
U.S. Pat. No. 4,012,301 Hydrocarbons from CO and $H_2$.
U.S. Pat. No. 4,182,663 Conversion of $O_2$ to $O_3$.
U.S. Pat. No. 4,026,778 Isomerization of Vitamin A compounds.
U.S. Pat. No. 3,945,897 Preparation of halolactams.
U.S. Pat. No. 4,004,996 Fluorination of amines, amino acids, polyamides, etc., with liquid $HF/F_2$.
U.S. Pat. No. 3,902,980 $CH_3$—$CHCl_2 + Cl_2 + O_2 \rightarrow CH_3COCl$.
U.S. Pat. No. 4,144,152 Kepone degradation with aq. base or $H_2$.
U.S. Pat. No. 3,554,887 Photochlorinations in radiation-transparent plastic capillaries.
U.S. Pat. No. 4,000,050 Oxidation and skeletal rearrangements of "Santalene" hydrocarbons.
U.S. Pat. No. 3,923,620 Trialkyl or trialkenyl phosphites to phosphates.
U.S. Pat. No. 3,963,570 Addition of $(BuO)_2P$-OH to $C=C$ in an oleamide.
U.S. Pat. No. 4,104,145 Benzene + $NO_2$ + $O_2 \rightarrow$ nitrobenzene.
U.S. Pat. No. 4,105,520 Cyclohexane + $NO_2$ + $O_2 \rightarrow$ adipic acid.
U.S. Pat. No. 4,045,316 Removal of vinyl chloride from gas streams.
Brit. Pat. No. 1,462,722 $SO_2$ & $NO_2$ removal from effluent gases.
Jap. Pat. No. J5 2033-882 Removal of $NH_3$ from effluent gases.
Jap. Pat. No. J5 5011-055 Removal of mercaptans and sulfides from effluent gases.

Of particular interest with regard to the present invention is U.S. Pat. No. 3,926,556, which is directed to the destruction of pyrogens in biological and organic fluids by the synergistic action of ultraviolet and microwave irradiation on macromolecular components of the pyrogens. The above listed U.S. Pat. No. 3,554,887 is also of high interest, as disclosing U.V.-transparent capillaries consisting of polymers of ethylene or chloro/fluoro-substituted $C_2/C_3$ olefins.

The foregoing '556 patent discloses the use of a plurality of capillary tubes (disposed around or parallel to a U.V. lamp) through which the fluid to be treated is passed. In this manner, the maximum thickness of the body of the fluid being irradiated is no greater than the inner diameter of the tubes, which may be as small as 0.1 mm. Thus, even when the fluid is one—such as blood—which strongly absorbs U.V., a major proportion of the fluid is penetrated by the radiation. Various apparatus arrangements by means of which the fluid passing through the tubes is simultaneously subjected to the action of microwaves are also disclosed in the patent.

It is evident that the thickness of the fluid body being treated could be reduced even further by using smaller diameter capillaries. Glass capillaries of hair-like dimensions are known. U.S. Pat. No. 3,268,313 discloses a method of melt-spinning "hollow fibers" (from ordinary glass) having outer diameters of from 7.5 to 75 microns (and having from 10 to 65% of their volume hollow). No reason is apparent why comparably sized hollow fibers could not be made from U.V.-transparent glasses, such as silica or VYCOR (registered trade name of Corning Glass Co., Inc.), at least by flame-drawing. Methods of forming headers or "tubesheets" in combination with glass fibers are also known (see, for example, U.S. Pat. No. 4,219,613). Presumably, such methods could be adapted to structures of the type shown in the '556 patent (FIGS. 1 and 1A, specifically), i.e.—structures in which the fibers would be disposed in parallel array around a cylindrical U.V. lamp (assuming that the matches of expansion coefficients appropriate to the contemplated operating temperatures could be attained for the fibers, tubesheet, etc.). It is also known that blood can be passed through hairlike hollow fibers (witness the now well-known hollow-fiber type "artificial kidney" or dialyser) without serious difficulty (at least from heparinized patients). Thus, although the prior art itself does not contemplate so doing, it would appear feasible to practice the process of the '556 patent with capillaries having hairlike dimensions, thereby achieving a substantial reduction in the thickness of the fluid "layer" being irradiated (and in the thickness of the capillary wall that the radiation must penetrate). This, of course, is with the proviso that the fibers would have to be positioned around the U.V. lamp in such manner that the innermost fibers would not block off exposure of the outer fibers to the radiation (a reflector around the outside of the fiber array not being feasible for the '556 process because it would interfere with microwave coupling with the materials inside).

If it were possible somehow to irradiate each fiber from all sides, a relatively large number of fibers could be used without concern for mutual shading and the thickness of the fluid the radiation would have to pass through in order to achieve complete penetration would be only half the inner fiber diameter.

OBJECTS OF THE INVENTION

A primary object of the present invention is to provide a photochemical apparatus and method whereby the thickness of the container wall and of the body of fluid which must be penetrated by the irradiation is considerably reduced.

A corollary object is to provide such an apparatus (and method) in which a much higher proportion of the reactor volume is occupied by reactant molecules receiving radiation.

A further object is to achieve full utilization of the inherent advantages of hollow fibers (in parallel array) as a photochemical reactor configuration.

Another object is to provide a photochemical apparatus and method in which the fluid being treated is passed through capillaries, each of which is surrounded by a confined, actinic radiation-emitting plasma (ionized gas).

An additional object is to provide an apparatus and method of the latter type in which the ionizing potential utilized to form the plasma is provided either by electrodes within the plasma-confining means (such as a housing or jacket) or by establishing a radio frequency (R.F.) field in the gas.

Another object is to utilize microwaves, not only to form the plasma but also for whatever beneficial effect they may have on the desired reaction in conjunction with the actinic radiation.

It is also an object to provide an apparatus which can be used to treat fluids either with microwaves alone or conjointly with microwaves and actinic radiation.

Another object is to provide a photoreactor apparatus which permits efficient flow-through operation and accurate metering, even when the volume of material to be irradiated is quite small.

Still another object is to provide a photoreactor which can be operated in such manner that the reactants can be repeatedly exposed to radiation for brief periods of time, separated by substantially longer intervals.

It is also an object of the invention to provide an apparatus uniquely adapted for the controlled irradiative treatment of moving solid or hollow fibers.

Additional objects will be made apparent to those knowledgeable in the art by the following specification and claims.

SUMMARY OF THE INVENTION

It has been discovered that the foregoing objects can be achieved by utilizing, as a photoreactor, a plurality of capillary tubes passing through what, in effect, is the interior of an actinic radiation-emitting lamp.

BRIEF DESCRIPTION OF THE DRAWINGS

FIG. 1 shows a vertical cross-section of a photoreactor in which the gas is ionized by means of a surrounding R.F. induction coil (shown pictorially), together with a closed flow system comprising a heat exchanger, sump and circulating pump. FIG. 2 depicts a photoreactor, in vertical cross-section, wherein the ionizing potential is provided by electrodes disposed inside the jacket, together with a variable A.C. power supply, transformer and variable resistance.

DEFINITIONS

Figure 1:
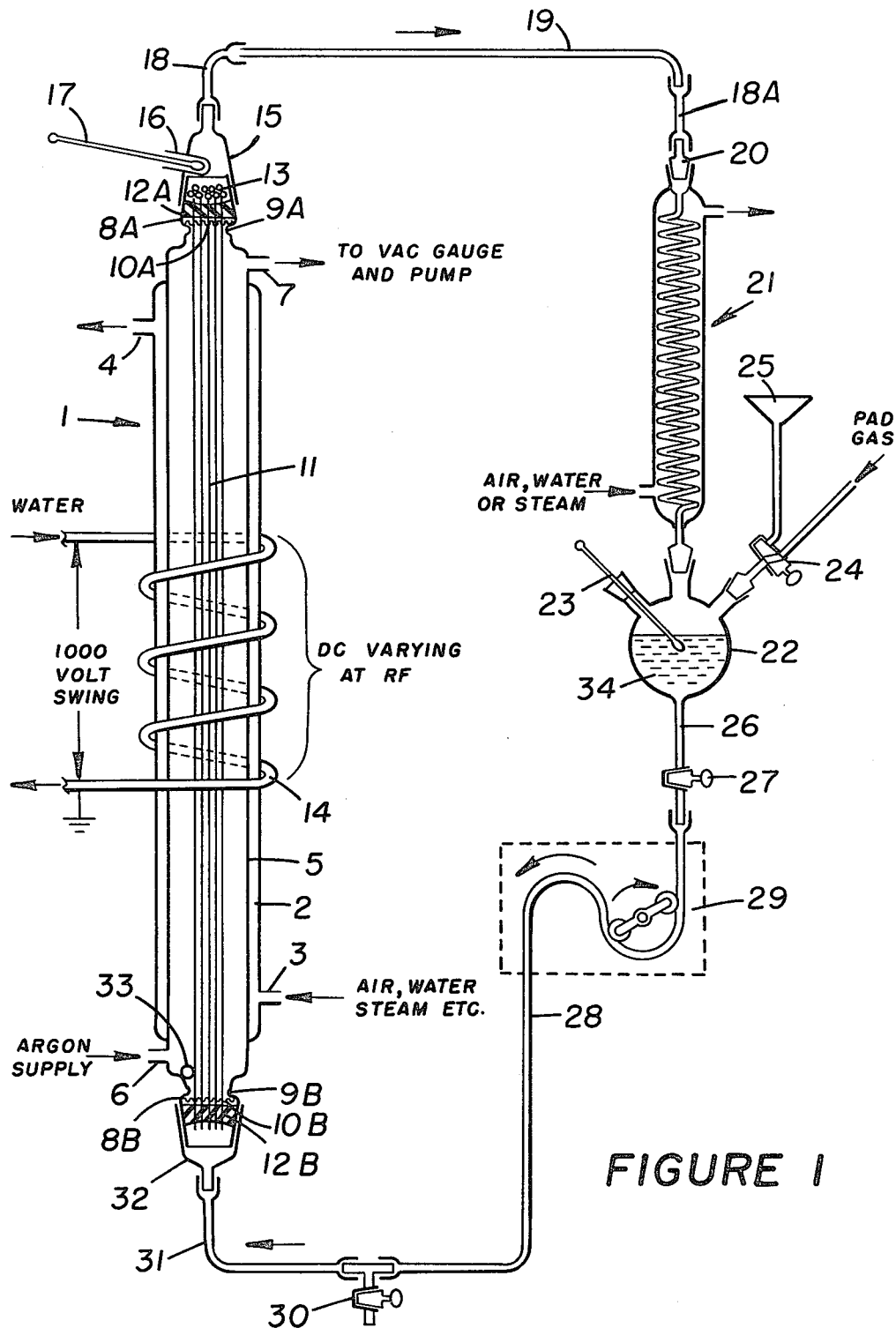
FIGS. 1 and 2 illustrate two different embodiments of the apparatus of the invention.

By "actinic radiation" is meant visible or ultraviolet radiation.

By "reaction zone" is meant the portion of the internal volume of the photochemical reactor tube or lamp occupied by radiation-penetrated fluid (the reactant(s) per se, or a solution thereof in a liquid reaction medium).

The term "capillary" is meant to include capillaries of hairlike dimensions, i.e., having inner diameters as small as a few microns.

The term "generally parallel array" of capillaries is meant to include arrays in which the capillaries are of generally U-shaped or even circular configuration; in all such arrays, no capillary touches the jacket wall or any other capillary over at least most of the portion of it which is within the plasma.

It is to be noted that two portions of a unitary tubesheet body can, in cooperation with an appropriate header arrangement, function as the two tubesheets specified in the following definition of the apparatus of the invention. This of course requires the use of capillaries flexible enough to assume a generally circular or U-shaped configuration.

The term "fluid" is intended to include gases; the utility of the invention is not limited to irradiation of liquids.

So far as Applicants are aware, all plasmas capable of emitting actinic radiation of sufficient intensity to be useful for photochemical purposes are ionized gases. However, any visibly radiating fluid emitting radiation of sufficient energy to penetrate the capillary walls and induce the desired photoreaction is considered a "plasma" for the purposes of the present invention.

The invention itself may be defined as a photochemical reaction apparatus comprising the combination of:
(1) an assembly of a pair of tubesheets and a generally parallel array of capillaries transparent to actinic radiation and having two open-ended terminal portions each, one portion passing through and sealingly engaged with one of said tubesheets and the second portion passing through and sealingly engaged with the other of said tubesheets,
(2) a gas, convertible to an actinic radiation-emitting plasma by application of an ionizing potential thereto,
(3) a generally tubular jacket having closeable conduit means for introducing said gas to the interior thereof,
(4) means for developing said ionizing potential, and
(5) header means for introducing a fluid to be irradiated to the interiors of said capillaries;
said assembly being disposed in said jacket in such manner that each end of the jacket is closed by and sealingly engaged with one of said tubesheets and said gas being confined within said jacket at a pressure such that it can be ionized by said potential.

It is to be noted that the gas specified in the foregoing definition is an essential working element of the combination and is not the material worked on or treated in the apparatus.

The capillaries can range in size from hairlike dimensions up to several millimeters in outer diameter. Preferably, however, they have inner diameters of from several microns up to about 1000 microns and wall thicknesses of less than half their inner diameters.

Preferably, each end of the jacket is sealingly engaged with a header; i.e., the apparatus preferably comprises both inlet and outlet headers.

The invention may alternatively be defined as a photochemical process in which a fluid comprising (or consisting of) a photochemically reactive substance is passed through a plurality of radiation-transparent capillaries, each surrounded by a plasma emitting a reaction-activating or -modifying radiation.

DETAILED DESCRIPTION

Referring now to FIG. 1, an apparatus embodiment of the invention will now be described. The photoreactor itself, designated generally by the number 1, can be considered as a modified, all glass Liebig condenser in which the inner tube is stoppered at each end, contains a parallel array of capillaries passing through the stoppers and is fitted with lateral inlet/outlet connections. Thus, an outer jacket (2) is fitted with fluid inlet/outlet connections (3) and (4) and sealingly engaged at each end with a center tube (5) fitted with side connections (6) and (7). The center tube terminates at each end in a truncated, ground glass, standard taper male joint (8A, 8B) joined to the center tube through a necked-in, tube section defining an annular concavity (9A, 9B) which acts as a positioner and support for a disc (10A, 10B) of plastic screening inserted within the tube end (male joint). Spaced apart, U.V.-transparent capillaries (11) are disposed in parallel array within the center tube, their ends extending through the screens and through tubesheets (12A, 12B). Each tubesheet is sealingly engaged with the fiber ends passing through it, and with the inner surfaces of the male joints, and is formed of a material sufficiently elastic to accommodate changes in the size of the male joint due to expansion or contraction. The space within the uppermost male joint above the fiber ends is largely occupied by glass spheres (13), in order to reduce the free volume of the system external to the capillaries.

A water-cooled, copper tubing induction coil (14) supplied with a D.C. potential, varying at a radio frequency, is disposed around the photoreactor.

To the uppermost male joint is fitted a female, ground glass, standard taper joint (15) having a thermowell (16) in which a thermometer (17) is inserted. The latter joint is connected, through flexible, solvent-resistant tubing lengths (18, 18A), a length of glass tubing (19) and a male joint (20) to a spiral condenser (21) which functions as a heat exchanger (cooler) and is mounted on a three-necked flask (22) fitted with a thermometer (23) and a two-way stop-cock (24) connected to a funnel (25) and a gas inlet/outlet. The flask functions as a sump or reservoir (for the fluid (34) to be irradiated) and is bottom-connected, through a glass tube (26) and stop-cock (27) to a flexible tube length (28) passing through an adjustable speed, roller-type circulating pump (29— shown representatively) to a drain and sample cock (30) connected in turn by another flexible tubing length (31) and another female joint (32) to the lowermost male joint (8B).

An ionizeable gas is formed within the inner tube (5) by introducing a drop of mercury (33) through inlet (6), flushing with Argon gas through inlet (6) and outlet (7), closing the inlet and outlet (by means not shown), connecting outlet (7) to a vacuum pump and gauge (not shown, reopening (7) and pumping down until the pressure within tube (5) is reduced to a suitably low value (less than 1 mmHg). Ionization is effected, and the gas converted to a U.V.-emitting plasma, by applying a sufficient potential, at an appropriate radio frequency (1000 volts at about 4 megacycles/sec., for example) to the coil.

Figure 2:
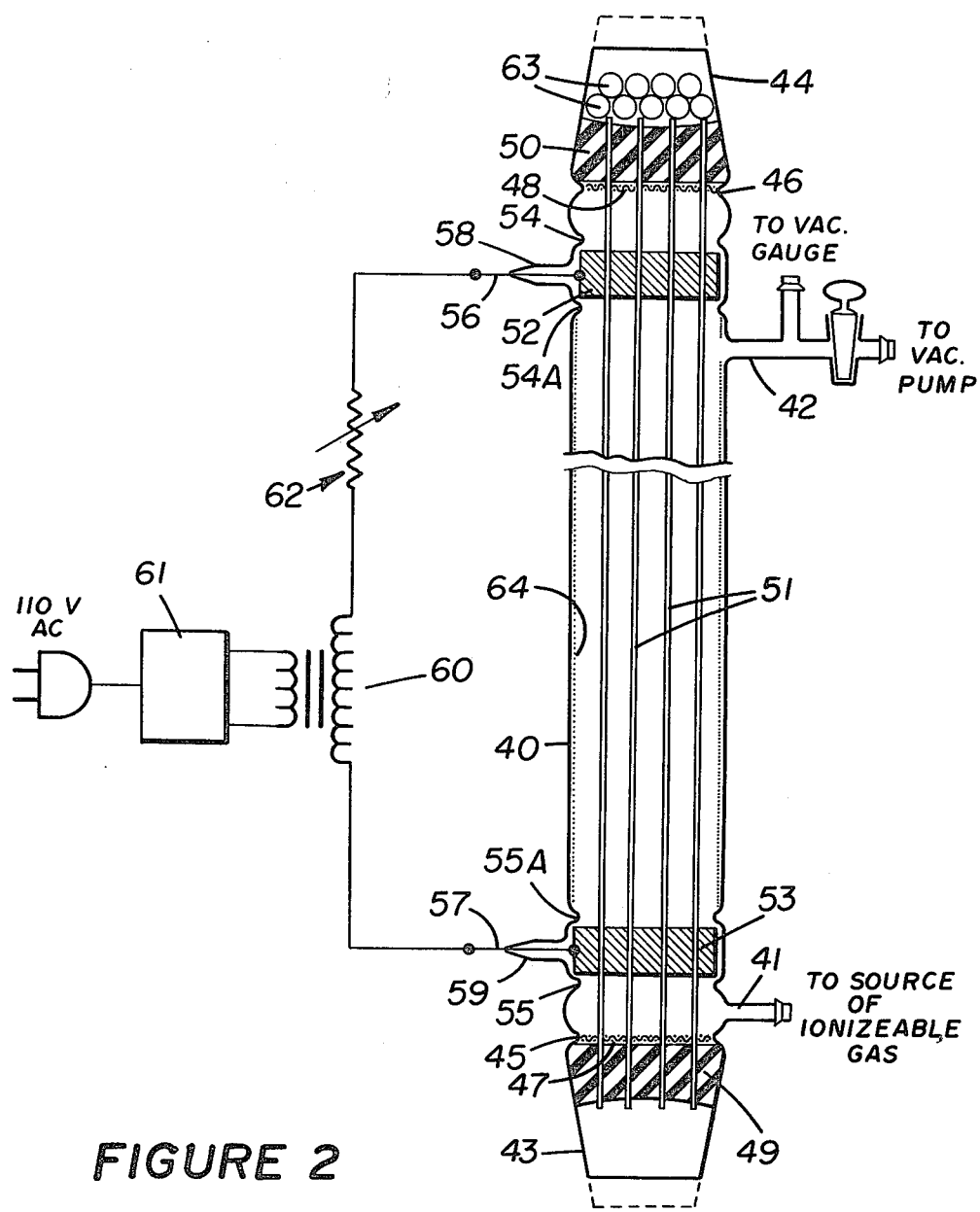

Turning now to the alternative photoreactor of FIG. 2, a PYREX (Trademark of Corning Glass Works) tube (40), having an inlet (41) and an outlet (42, adapted as shown for connection to a vacuum gauge and a vacuum pump) terminates at each end in a ground glass male joint (43, 44) each truncated (as indicated in phantom) and joined to the tube through necked-in portions of the tube defining annular concavities (45, 46) acting as positioning supports for screen discs (47, 48) inserted through the ends of the joints. The discs in turn each support a resinous tubesheet (49, 50) of the type described above (elements (12), FIG. 1). A plurality of U.V.-transparent capillaries (51; only a few shown), open at both ends, are disposed in the tube with their terminal portions passing through and in sealing engagement with the tubesheets (which are also sealingly engaged with the adjacent tube wall sections). Also disposed in the tube, one near each end thereof, are two cylindrical electrodes (52, 53) positioned between two annular concavities each (54, 54A and 55, 55A, respectively) and connected through electrical leads (56, 57; passing through seals 58, 59) with ionizing potential source means consisting of a step-up transformer (60), the primary of which is connected to an A.C. power source (a variable autotransformer, (61), shown semipictorially. The transformer (60) is preferably of the current limiting type commonly used with eight-foot fluorescent light tubes (a fixed voltage power supply generally being used with the latter type of transformer). A variable resistance may be included in the circuit as shown (62) or the elements (60), (61), (62) replaced with a commercial fluorescent light power supply unit appropriate to the length of "lamp" being used. Glass beads (63) disposed above the upper tubesheet again serve to decrease the volume of the portion of the flow system external to the capillaries. Optionally, a fluorescent coating (64) on the inside of the jacket wall (or a separate portion of a fluorescent lamp tube disposed within the jacket) functions as a source of visible light, both internally and externally of the reactor.

The apparatus of FIG. 2 can be modified to make it useable with a microwave source of either of the types described in the discussions of FIGS. 1 and 2. That is, the seals (elements (58), (59)) and electrodes (elements (52), (53)) in FIG. 2 may be replaced by hollow, ground glass stoppers removeably inserted in female joints mounted on the reactor wall, electrical lead wires (like elements (56), (57)) and filaments of the type commonly employed in fluorescent U.V. greenhouse lamps. The lead wires pass through small openings in the stopper handles and the filaments and joints are disposed (and sized) so that the filaments are located just inside the reactor when the stoppers are in place. A vacuum seal is assured by filling the stoppers—with the leads and filaments in place therein—with a viscous resin and curing it, and by use of a suitable vacuum grease on the ground glass surfaces. When the microwave source employed is a coil around the reactor (as in FIG. 1) the stopper/electrodes are replaced by ordinary stoppers (to avoid coupling with and heating of the electrodes).

The apparatus of the invention may be utilized for the treatment of fluids or to treat or coat fibers.

The process of the invention is practiced with fluids by passing the fluid to be irradiated through the capillaries while the ionizeable gas is present in the form of a plasma emitting electromagnetic radiation which is capable of passing through the capillary walls and catalyzing or desirably altering the course of a chemical reaction within the fluid. Usually, it will be advantageous to circulate the fluid so that it makes a number of passes through the capillaries. As a general rule, actinic radiation—and most often ultraviolet radiation—will be required.

The process of the invention is practiced with fibers (hollow or solid) by passing the fibers, preferably one-to-one, through the capillaries and utilizing the actinic radiation to cause physical or chemical changes in the fibers or to cause them to react with fluids in contact with them in the capillary lumens. The fluid may be co-introduced with the fibers, as—for example—by drawing the fibers through a body of a liquid lubricant or reactant enroute to the capillaries. For another example, a gas may be passed co- or counter-currently through the capillaries around the moving fibers.

When the fibers are hollow, they may be filled with an inert or reactive core fluid, which may or may not be the same as any fluid between the capillary walls and the external fiber surfaces. Any component of a fluid which the fibers contain or encounter as they pass through the capillaries may be able to diffuse into (or through) the fiber walls and may react directly with the fibers or may act as a photo-sensitizer.

By this method, the fiber structure or surface(s) may be desirably modified, as for example, by formation of a salt-rejecting "skin" on hollow fibers to be employed for reverse osmotic brine desalination, cross-linking (curing) the fibers to strengthen or densify them, forming ion-exchange groups or by imparting anti-static or other desirable properties to textile fibers.

The fibers may be hand-threaded into the capillaries, to get them started, or may be led through belled extensions of the capillaries by hydraulic or pneumatic flows.

The present invention resides in a method and apparatus for carrying out photochemical reactions, not in the photochemistry itself. Neither does it reside in methods of converting ionizeable gases to radiating plasmas. Those knowledgeable in the art of photochemistry and plasma generation (see the text: "Photochemistry"; J. G. Calvert and J. N. Pitts, Wiley & Sons, N.Y.; 1966 and F. K. McTaggart's book "Plasma Chemistry In Electrical Discharges"; Elsevier Pub. Co., 1967, and by the disclosures of the above cited '556 and '887 patents), will be able to practice the present invention without recourse to further invention.

Accordingly, the present disclosure need not be burdened by any substantial discussion of the well-known factors which should be considered in designing the apparatus and experimental protocol for specific plasma-utilizing photochemical reactions. However, the disclosures of the prior art specific to photochemistry and plasmachemistry—including the '556 and '887 patents—leaves something to be desired in regard to suitable tubesheet materials and fabrication methods.

Tubesheet Materials

Borosilicate "solder glasses" suitable as tubesheet materials in high temperature (up to 350° C.) sodium/sulfur battery cells, wherein the electrolyte/separator takes the form of hollow, borosilicate, glass fibers, are disclosed in U.S. Pat. Nos. 3,917,490, 4,219,613 and 4,224,386. Of these, the '613 patent is of particular interest as disclosing tubesheet/hollow fiber assemblies in which the internal structure of the tubesheet is such that leak-free ("helium tight") assemblies are more readily produced. An implicit requirement for such assemblies to be fabricatable and to be useful at elevated temperatures is a relatively good match in thermal expansion coefficients for the fiber and tubesheet materials. This of course is possible for pairs of glasses, ceramics, etc., other than the specific materials disclosed in the several above-cited patents. (U.S. Pat. No. 3,994,708 discloses a U.V.-transmissive borosilicate glass, from which capillaries—even of hollow fiber dimensions—presumably could be made.)

Similarly, good matches in expansion coefficients for the tubesheet and "header" materials are desirable even when the most elevated temperature to which the reactor will be subjected is that encountered in curing a resinous tubesheet by heating. However, an alternative is to employ a tubesheet material which can be cured without heating. If the latter material is also elastic enough to (reversibly) deform in response to thermal stresses, it will be suitable for tubesheets to be subjected to elevated reaction temperatures (short of those at which it detrimentally alters).

A variety of tubesheet materials are known to be suitable for use at ordinary temperatures, such as those commonly encountered in membrane separatory processes in which the membrane employed takes the form of a plurality of (microporous or semi-permeable) hollow fibers. The fibers ordinarily are made of melt-(or solution-) spinnable resin compositions not greatly different from some of those disclosed for the U.V.-transparent capillaries employed in the method of the above-cited U.S. Pat. No. 3,554,887. (It may be noted that hollow fibers could also be spun from acrylate polymers—which are known to be substantially transparent to U.V. and would pose no large problems as to selection of appropriate tubesheet materials.)

Another consideration is the susceptibility of the tubesheet material to swelling (or degradation) by any component (such as the reaction medium or carrier solvent) in the fluid to be irradiated. This will be largely a matter of solvent choice, if it is desired to use an already assembled reactor. That is, the solvent not only should dissolve the reactants (and not detrimentally absorb the radiation) but should also not swell, dissolve or degrade the tubesheet. For example, tubesheets consisting of air-cured silicone rubbers, such as a SILASTIC (registered trademark of Dow-Corning Co.), were found to be unaffected by isopropyl alcohol (at least at ordinary temperatures) but unsuitable for use in contact with methylene chloride.

Cured-in-place, elastomeric acrylonitrile-butadiene copolymers are considered an alternative to siloxane resins as tubesheet materials.

An alternative type of tubesheet material are inorganic cements, such as those marketed by the Sauereisen Cement Co., Pittsburgh, Pa., U.S.A. Their "liquid porcelains", such as Sauereisen No. 1, harden by air-drying and their "plastic porcelains", such as Sauereisen No. 31, harden without evaporation or air-drying. If necessary to ensure a vacuum-tight seal, the hardened tubesheet may be coated with a thin layer of a solvent resistant resin (which can readily be renewed or replaced after prolonged use).

Difficulties due to solvent/tubesheet interactions can be considerably reduced by emplacing a thin disc of a material (KEL-F—trademark of 3M Company, or DYNEL—trademark of Union Carbide Corporation, for example) which has a high solvent resistance, appropriately perforated to fit around the capillary ends, on top of a tubesheet resin body, before it is cured. Alternatively, the disc may be cemented onto an already cured or hardened tubesheet.

The use of mercury seals above the tubesheets (the plural being used because a U-shaped configuration for the reactor is feasible) is contraindicated (aside from microwave coupling problems in the set-up of FIG. 1) because even trace amounts of mercury in the fluid being irradiated are inimical to efficient U.V. utilization.

According to the earlier cited '556 patent, Dow-Corning Silicone Oil 200 has good heat transfer characteristics and is relatively lossless (is essentially transparent to actinic radiation). However, the effectiveness of said oil as a solvent for any particular material to be irradiated and the ease with which the reaction product(s) can be recovered from it (and its effect on a given tubesheet material) must be determined experimentally.

Reaction Temperature Control

The '887 patent discloses a photoreactor in which a central U.V. lamp and a parallel array of resinous capillaries around it are disposed in a jacket having inlet/outlet means for passing a coolant, such as water, through the unit in contact with the exteriors of the capillaries. Water (purified water, that is) is sufficiently transparent to U.V. so that a large photon loss apparently does not result and the efficient cooling action is said to make it possible to carry out highly exothermic photoreactions (such as direct chlorinations of lower hydrocarbons) without inclusion of moderating diluents. Since the plasma state cannot be attained with liquids, their use for heat removal from the capillaries is ruled out in the practice of the present invention. Further, the ionized gas constituting the plasma will generally be so attenuated as to be a rather inefficient means for heat transfer from the capillaries to an external cooling jacket.

Thus, the following steps should be taken if the contemplated reaction is likely to be highly exothermic. The length of the flow path between the exit end of the capillaries and the inlet to a cooler (as in FIG. 1) should be made as short as possible. The residence time per pass through the capillaries should be shortened (by increasing the pumping rate and/or using shorter capillaries). And, if necessary, the concentration of the reactant(s) in the fluid being circulated should be decreased. In this manner, the advantages of the present method may be realized, although at some expense as to the advantages of the patented method, even though the reaction carried out is quite exothermic.

Surface Tarring

A commonly experienced difficulty with photochemical reactions is the formation of hard-to-remove, U.V.-absorbent deposits, generally colored, on the surface (silica, usually) through which the radiation enters the fluid being treated. The present method is not immune to this problem, at least when quartz (or high silica glass) capillaries are employed. However, according to U.S. Pat. No. 3,637,342, such deposition is minimized when the radiation transmitting surface is a fluorocarbon polymer. Thus, the problem should be largely obviated if the capillaries consist of fluorocarbon polymers, such as those (polytetrafluoroethylene homopolymers and co-polymers with hexafluoropropylene) disclosed in the '887 patent. It may alternatively be helpful to coat the insides of quartz or glass capillaries with materials, such as metaphosphoric acid, which have been successfully used to prolong the lives of free radicals generated in discharge reactions, thus perhaps delaying formation of deposit-prone materials until after the treated fluid has entered elements of the flow system more easily cleaned or less reluctantly disposed of than the capillaries. Of course, when the capillaries are of a type mass produced for other purposes (heat exchangers employing fluorocarbon polymer capillaries or hollow fibers are known, for example), they should be relatively inexpensive and may be discarded if they eventually do "gunk up".

Another remedy is suggested by U.S. Pat. No. 4,028,135, which is directed to use of "shortwave ultraviolet light in the presence of oxygen" to clean the surfaces of quartz resonators. The ozone produced from the oxygen (when the U.V. includes a wavelength less than 2000 Å), together with U.V. of a wavelength such as to be absorbed by the material to be removed, in effect burns off the contaminants. The surface to be so treated is generally pre-cleaned with an organic solvent in the presence of air. It will be apparent that this method should be easily adapted to cleaning of the capillaries in the photoreactor of the present invention (under license from the U.S. Government, the assignee of the patent).

Control of Residence Time in the Irradiation Zone

The irradiation zone in the photoreactor will generally not be coextensive with the unpotted portions of the capillaries (the portions between the tubesheet support discs in either of FIGS. 1 and 2, for example). However, the difference between the lengths of the irradiation zone and the unpotted capillary portions will usually be estimatable with sufficient accuracy from visual observation of the plasma to permit the necessary correction to be made.

The average residence time of a reactant molecule in the photoreactor, per pass therethrough, will be directly proportional to the distance between the inner tubesheet faces and inversely proportional to the circulation (pumping) rate through the system, independently of the total volume of fluid being circulated. The total residence time in the reactor will be directly proportional to the ratio of the total volume of the capillary lumens (between the tubesheets) to the total fluid volume, independently of the circulation rate. The total number of passes through the reactor in a given process period will be directly proportional to the circulation rate and inversely proportional to the total fluid volume (assuming the total fluid volume is sufficient so that the reservoir (sump) never empties). Perfect mixing of the reservoir contents is of course implied in each of the preceding statements.

The apparatus of FIGS. 1 and 2 facilitates subjecting the reactants to successive, relatively brief periods of irradiation, separated by relatively long, intervening periods in the system external to the irradiation zone. If the desired products are themselves U.V.-stable but are formed through U.V.-degradeable intermediates (in turn derived from the initially formed active species), the foregoing regime could result in less degradation of the essential intermediates and a higher yield of the desired product.

U.S. Pat. No. 3,756,934 (Sagan et al), which discloses a U.V.-catalyzed process for converting simple gases to amino acids and polypeptides, is of interest in the latter regard. So also is British Patent No. 1,344,962, which is directed to a method of temperature control of photochemical reactions in which the reactants are exposed to intense light radiation in each of a series of illumination zones separated by intervening cooling zones. High selectivity in the reaction is said to be achieved in this manner.

A similar result would be expected from the practice of the present invention in the photoreaction system of FIG. 1 herein, with either of the photoreactors of the two Figures.

However, even when the volume of the flow system external to the capillaries is minimized, the residence time between exposures to radiation may be considerably longer than necessary. Also, even with short capillaries and high flow rates, the duration of exposure to radiation may often be unnecessarily or undesireably long. A considerable improvement, both as to efficiency and effectiveness, would appear to be to mask the exterior (or interior) surfaces of the capillaries in a banded pattern, so that transparent bands alternate with radiation-opaque bands. Also, the capillaries can be made quite long; 8 feet, for example. The successive transparent and/or opaque band widths can vary as the pattern repeats along the capillary length.

Radiation intensities comparable to those developed in flash photolyses of course will not be achieved, but the duration of irradiation through each transparent band can be made comparably brief to a flash by narrowing the band and increasing the flow rate of the fluid being irradiated.

Control of Radiation Wavelength

A great deal is known (see the above-referenced Calvin and Pitt text, for example) about the wavelengths of actinic radiation from various lamps—including so-called cold plasma lamps. The use of various filters to narrow the range of the emitted radiation reaching the reactants is likewise well known. So also is the use of fluorescent materials to convert shorter wavelength radiations to longer wavelength radiations (of generally narrower range).

In the practice of the present invention, the choice of the ionizeable gas composition and of the pressure under which it is subjected to ionization will largely determine the spectrum (relative intensities at various wavelengths) of the radiation from the plasma. Mercury vapor is an excellent source of U.V. but other gases, such as argon, neon, and nitrogen—in plasma form—are also good sources of actinic radiation. A suitable pressure range for visible plasma formation with various gases is from about 25 microns up to about 0.5 mm of Hg.

The knowledge of the art as to filtration and fluorescence can be applied by coating the exterior (or interior) surfaces of the capillaries with the appropriate materials.

Although most photochemical reactions require radiation having wavelengths in the U.V. region, visible light, from both fluorescent and tungsten bulbs, has been found suitable for some reactions. The successful photochlorination of alkanols, for example, with light from a tungsten bulb is disclosed in U.S. Pat. No. 3,993,550 (see also Journal of Organic Chemistry, 39, 520-523 (1974). In the practice of the present invention, visible light may be emitted as such from the plasma or may be emitted from a fluorescent coating on the capillaries responsive to a shorter wavelength emission from the plasma. If the reaction is not detrimentally affected by the shorter wavelength radiation or both U.V. and visible light are required, the fluorescent coating may be on the inside surface of the jacket, shown (as an option) in FIG. 2. In this case, the photoreactor becomes essentially an ordinary fluorescent light having capillaries passed through it.

In addition to the various actinic radiation-transparent materials disclosed in the standard texts on photochemistry, the following materials (from which capillaries should be preparable by known methods) may be taken note of. According to U.S. Pat. No. 4,042,334, hot-sintered oxides of aluminum or yttrium, as well as polystyrene are radiation transparent. As noted earlier herein, a U.V.-transmissive borosilicate glass is disclosed in U.S. Pat. No. 3,994,708.

The importance of being able to minimize the depth of the fluid which must be penetrated by the radiation in a photochemical process is apparent from the teachings of U.S. Pat. No. 3,948,742 which is directed to the photochemical chlorination of cyclopentane to produce a precursor which can be converted to hexachlorocyclopentadiene by subsequent chlorination/"cracking" reactions at substantially higher temperatures. According to the patent, X-rays or gamma radiation is used, rather than the conventionally used U.V., because "the ultraviolet light is already absorbed in the first few millimeters of the solution, i.e., no light can penetrate even into parts of the reaction vessel located at a short distance from the source of radiation . . . "

EXAMPLE

The following example is for purposes of illustration and is not to be construed as limiting the present invention in a manner inconsistent with the claims appended to this specification.

Example 1—Isomerization of 9-Tricosene

A photoreaction system, essentially as shown in FIG. 1 (but using an A.C.-D.C., stainless steel centrifugal pump, Model 10-40-316, made by the Micropump Corporation, Concord, CA., and a D.C. supply operated off a variable A.C. autotransformer set at 19 volts) was set up. Six quartz capillaries, 24 inches long×1 m.m. inner diameter, 2 m.m. outer diameter were used. The tubesheets, consisting of 731 RTV Silastic (cured in-situ) were supported by pierced nylon discs (10A,B—FIG. 1) with beveled edges. The joints at each end of the reactor were urged together by springs attached to "horns" (not shown in the drawings) of the conventional type.

The R.F. was supplied to the water-cooled, copper induction coil (seven turns) by a Lepel, Model T-10-3-MC-E-S high frequency generator, operated at 100 ma grid current, 500 ma plate current and about 4 megacycles with a 1000 volt, varying D.C. output; power control set at 1, and SR control at 270 ma.

The ionizeable gas around the capillaries was formed by introducing a drop of liquid mercury in the gas space, flushing with Argon and pumping down to a pressure less than 0.1 mm Hg.

A solution of 3 grams of synthetic Muscalure (a housefly sex attractant) consisting of about 80%/20% cis/trans 9-tricosene) in spectral grade isopropanol (90 ml) was circulated through the reactor at the rate of about 75 ml per minute, for 55 minutes (resulting in a total residence time in the capillaries calculated to be about 1 minute). Water cooling was used in the jacket around the plasma tube (5, FIG. 1) and air cooling in the spiral condenser. The reaction solution temperature never rose above 30° C., and the cooling water exit temperature never exceeded 35° C. A leak at the lower joint (8B, 32—FIG. 1) caused the run to be terminated.

Infrared spectroscopical comparison of the residue obtained from an evaporation-stripped sample of the reaction mixture, with a sample of the starting material, showed that the cis/trans isomer ratio had altered to about 75/25—considered to be about the optimum for housefly attraction. (The identifying IR peaks assigned to the cis and trans 9-tricosene isomers are found at 13.8 and 10.3 microns, respectively). A strong carbonyl peak found in the product sample (but not present in the starting material) at 5.8 microns was probably attributable to IPA oxidation to acetone (air was not excluded from the flow system).

It had been previously found that several days of irradiation were required to attain the same degree of isomerization, using a conventional (Rayonet type RS) U.V. irradiator.

No attempt was made to measure the intensity or frequency range of U.V. developed in the capillary photoreactor. (Actinometric methods for determining the photon flux are well known, as is the spectral output range for mercury vapor.) Neither was any work done to determine to what, if any, extent the acetone presumed to be present influenced the isomerization reaction (as a photosensitizer).

Subsequent further treatment of the product mixture, in the foregoing manner, for an additional 6 hours accomplished only a 2% further increase in the trans isomer content.

It will be apparent that the volume of the flow system external to the capillaries (in FIG. 1) could be reduced considerably, thus permitting a comparable decrease in the volume of the reaction solution (without causing loss of pump "prime") and a corresponding increase in the number of passes through the reactor in a given treatment period.

The Lepel generator used in the preceding example was cumbersome, for the scale of the rest of the reaction system. However, more recently developed R.F. generators of considerably less weight and bulk are now commercially available.

The practice of the invention with plasma tubes (or discharge tubes) is not limited to the electrode shape and disposition shown in FIG. 2. For example, each electrode may have the shape of a trough, of arcuate cross-section, disposed vertically between the tube (or jacket) wall and the capillary array. Preferably, these electrodes are relatively short troughs disposed on opposite sides of the array and at opposite ends of the tube. As another alternative, one or each of a pair of internal electrodes may be a coil of wire around the capillary array.

I claim:
1. A photochemical reaction apparatus comprising the combination of:
   (1) an assembly of a pair of tubesheets and a generally parallel array of capillaries transparent to actinic radiation and having two open-ended terminal portions each, one portion passing through and sealingly engaged with one of said tubesheets and the second portion passing through and sealingly engaged with the other of said tubesheets,
   (2) a gas, convertible to an actinic radiation-emitting plasma by application of an ionizing potential thereto,
   (3) a generally tubular jacket having closeable conduit means for introducing said gas to the interior thereof,
   (4) means for developing said ionizing potential, and
   (5) header means for introducing a fluid to be irradiated to the interiors of said capillaries;
   said assembly being disposed in said jacket in such manner that each end of the jacket is closed by and sealingly engaged with one of said tubesheets and said gas being confined within said jacket at a pressure such that it can be ionized by said potential.
2. The apparatus of claim 1 additionally comprising header means for collecting said fluid upon exit from said capillaries.
3. The apparatus of claim 1 in which said capillaries are of rectilinear configuration.
4. The apparatus of claim 1 in which said ionizing potential developing means is a radio frequency coil disposed around said jacket.
5. The apparatus of claim 1 in which said potential developing means is a pair of spaced apart electrodes disposed around or adjacent to said capillary array within said jacket.
6. The apparatus of claim 2 additionally comprising means for circulating said fluid through said capillaries.
7. The apparatus of claim 1 in which said ionizeable gas is a mixture of argon and mercury vapor, said mixture being at a reduced pressure of less than 1 mm Hg, and said capillaries consist of a high silica glass or quartz.
8. The apparatus of claim 1 in which said capillaries are coated, externally or internally, with a radiation-filtering or fluorescent material.
9. The apparatus of claim 1 in which the inner surface of said jacket is coated with a fluorescent substance.
10. The apparatus of claim 6 in which the capillaries are banded with a radiation opaque material in such manner that said fluid is alternately irradiated and not irradiated during each pass through the capillaries.
11. The apparatus of claim 1 in which said capillaries have inner diameters of from several microns to about 1000 microns and wall thicknesses of up to one-half of their inner diameters.
12. The photochemical process in which a fluid comprising a photochemically reactive substance is passed through a plurality of capillaries, each surrounded by an actinic radiation-emitting plasma, said capillaries being transparent to said radiation.
13. The process of claim 12 in which said plasma is a gas ionized by application thereto of an ionizing potential.
14. The process of claim 12 in which said fluid is circulated repeatedly through said capillaries and a flow system external thereto.
15. The process of claim 14 in which the capillaries comprise sections alternately transparent and opaque to said actinic radiation and said fluid is thus repeatedly exposed to the radiation for brief intervals during each pass through the capillaries.
16. The process of claim 14 in which said fluid is a solution of the cis and trans isomers of 9-tricosene in isopropanol.
17. The process of claim 13 in which said ionizing potential is developed by application of a radio frequency electromagnetic field to said gas.
18. The process of claim 13 in which said ionizing potential is developed between two spaced-apart electrodes in contact with said gas.
19. The method of irradiating solid or hollow fibers which comprises passing them through a plurality of capillaries, each of which is surrounded by an actinic radiation-emitting plasma, said capillaries being transparent to said radiation.
20. The process of claim 19 in which a fluid is introduced to and passed through said capillaries while said fibers are being irradiated.

* * * * *